United States Patent [19]
Dekan

[11] 4,010,643
[45] Mar. 8, 1977

[54] MEASURING DEVICE FOR TAPPING APPARATUS FOR FOAM-FORMING BEVERAGES

[76] Inventor: Istvan Dekan, Antonius-Kirchplatz 10, 44 Munster, Germany

[22] Filed: Jan. 17, 1975

[21] Appl. No.: 541,984

[30] Foreign Application Priority Data

Jan. 24, 1975 Germany .......................... 2439789

[52] U.S. Cl. .............................. 73/194 R; 73/200; 73/198
[51] Int. Cl.² .......................................... G01F 5/00
[58] Field of Search ................ 73/198, 195, 194 R, 73/200

[56] References Cited

UNITED STATES PATENTS

| | | | |
|---|---|---|---|
| 867,663 | 10/1907 | Körner .................................. | 73/198 |
| 1,189,348 | 7/1916 | Costello .............................. | 73/200 |
| 3,040,578 | 6/1962 | Smith .................................. | 73/257 |
| 3,403,555 | 10/1968 | Versaci et al. ..................... | 73/194 E |

FOREIGN PATENTS OR APPLICATIONS

| | | | |
|---|---|---|---|
| 1,267,394 | 6/1961 | France .............................. | 324/43 R |
| 847,861 | 10/1960 | United Kingdom ................ | 73/257 |

*Primary Examiner*—James J. Gill
*Assistant Examiner*—Anthony V. Ciarlante
*Attorney, Agent, or Firm*—Burgess, Dinklage & Sprung

[57] ABSTRACT

Measuring device for beverage-tapping apparatus having a feed line from a supply source to a measuring chamber, a volume measuring device with a meter connected thereto, and a valve outlet behind the measuring chamber with a valve, comprising primary element means positioned within the measuring chamber which can distinguish foam from compact liquid, switch means controlled by the primary element means with which the measuring device can be separated from the meter.

8 Claims, 4 Drawing Figures

MEASURING DEVICE FOR TAPPING APPARATUS FOR FOAM-FORMING BEVERAGES

BACKGROUND

The invention relates to a measuring device for beverage-tapping-apparatus having a feed line from a supply bin to a measuring chamber, a volume measuring device, and a meter connected thereto, and an outlet behind the measuring chamber provided with a valve.

Measuring devices of this type are described in German Utility Model No. 6,909,836. It was not possible to exactly measure the flow of foam-forming beverages with known measuring devices. Devices of this type are, therefore, not guaged to beer and similar beverages.

Beer and other beverages are transported with carbon dioxide pressure from the cellar to the tapping device. During relaxation of the beverage in a measuring chamber, the carbon dioxide leaves the liquid and produces foam within the measuring chamber. The known meter was activated by foam and carbon dioxide pressure. The foam formation primarily appears when starting a beer keg and also at the end.

SUMMARY

The invention provides a measuring device that also measures volumetrically with great accuracy foam-forming beverages. The measuring device of the invention is gaugeable and is capable of complying with industry requirements This is achieved with a measuring device for beverage-tapping apparatus of the type set forth above, where a primary element is positioned within the measuring chamber, with which foam from compact liquid can be distinguished and which furthermore has a switch, controllable by the primary element, by which the measuring device can be separated from the meter. When using a photo cell or an electric resistor as the primary element, the installation can be controlled so accurately that the volume indicated corresponds to the flown through volume.

DESCRIPTION OF THE DRAWING

To illustrate the invention, the drawing shows a measuring device for tapping apparatus for foam-forming beverages.

DESCRIPTION

Figure 1:
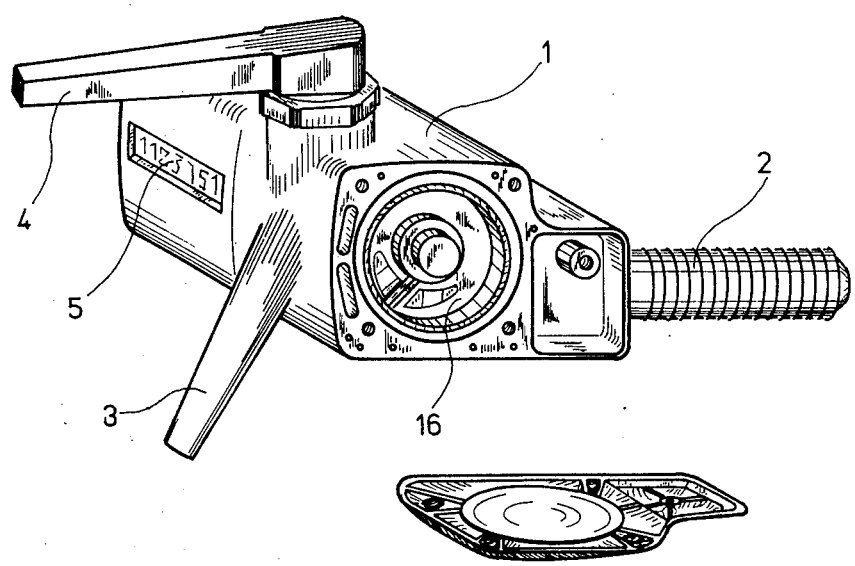
FIG. 1 is a perspective view of a measuring chamber with the cover removed.

It is known to provide a photoelectric hypsometer for a coin-operated installation which dispenses carbonated beverages of measured volumes, the operation of which is such that it controls the filling the emptying processes in the measuring area only when foam is present but not when the liquid is foam-free or when the pipe is empty (German Patent No. 1,145,045). However, this device cannot be used to control flow-through by a tap valve and to direct a meter which is coupled with a continuously operating measuring device.

In a further embodiment of the invention, the volume measuring device has at least one element which rotates proportionally to the liquid flow connected to an impulse sender by each n-th rotation ($N = 1, 2, 3 \ldots$) sends out at least one impulse to a receiver, which, via and UND-screen to which the signal from the primary element is given as a comparison signal, acts upon the meter with the impulses to be counted.

The control of the invention makes possible an interruption without delays and/or connection of the impulses originating from the rotating element. In the case of a compact liquid stream, the control of the primary element operates to give off a signal which is interrupted when foam appears. When the signal is interrupted, no signal appears at the exit of the UND-screen according to the rules of a logical control, so that also the impulses are not transmitted further. The meter stands at the primary element when foam appears A rotary piston carrying an impulse sender in the measuring chamber has proven particularly reliable for producing measuring impulses. As the impulse sender, particularly suited, for example, is a permanent-magnet which is affixed to the piston or to a carrying part, which acts with impulses upon a Hall-probe which is affixed outside the measuring chamber. As an alternative to this type of construction, it is possible to affix an element to the piston which dielectricity differs strongly from the piston material. With this element, a spool arrangement outside the measuring chamber is changed in its inductance which also produces an impulse to be measured.

According to the invention, there is provided, in the volume measuring device, a cylindrical measuring chamber with a centrally arranged carrier part, geared on the outside, around which rotates a cylindrical piston with inside gearing, whereby a wandering hollow space transports a measured liquid volume from an inlet to an outlet between the interior well of the measuring chamber and the exterior wall of the piston.

To further develop this embodiment, a hollow cylindrical piston at one front side of the measuring chamber openings may be petitioned to serve as an entrance and exit and which are separated by a wall. When the piston moves, the openings are periodically swept over by the piston-cross-section area. The piston has a slit through which the separating wall between the openings reaches. As explained below, the piston interior as well as the hollow space between the interior wall of the measuring chamber and the exterior wall of the piston serve as liquid reservoir.

The piston and the measuring chamber, as well as the other components of the actual tapping device (feed line, valve and outlet) may be made of a dielectricly indifferent plastic material, preferably glass-fiber-reinforced plastic. A detachable cover is provided over the measuring chamber and/or over the primary element-range, after the removal of which also the piston can be extracted from the measuring chamber. Due to this arrangement and the use of said material, it is especially simple to do the necessary cleaning of the tapping device.

It should also be pointed out that the construction also makes possible the affixing of the meter with indicator away from the mechanical measuring components of the tapping installation, for example, on a collector-indicator-board. It is also feasible to activate a generator to generate current for the electronic components of the measuring device via the rotating piston or the carrier element so that the measuring device can be made independent from an external supply of current.

According to the invention, it is alternatively possible to provide an electromagnetic coupling between the shaft of the volume measuring device and the shaft of the meter. Such a coupling can be switched on and off via a relay or an electric switch.

Referring now to the example shown in the drawing the measuring device for tapping apparatus according to the invention consists of a central housing part 1 with a connection piece 2 and an exit 3. The system of pipe lines is evident from FIG. 2. In the front part of the housing part, a cone stopcock valve 14 is affixed which connects the connecting part 2 and the exit 3 and which can be opened and closed via a lever 4 with a pivoting radius of 90°.

Figure 2:
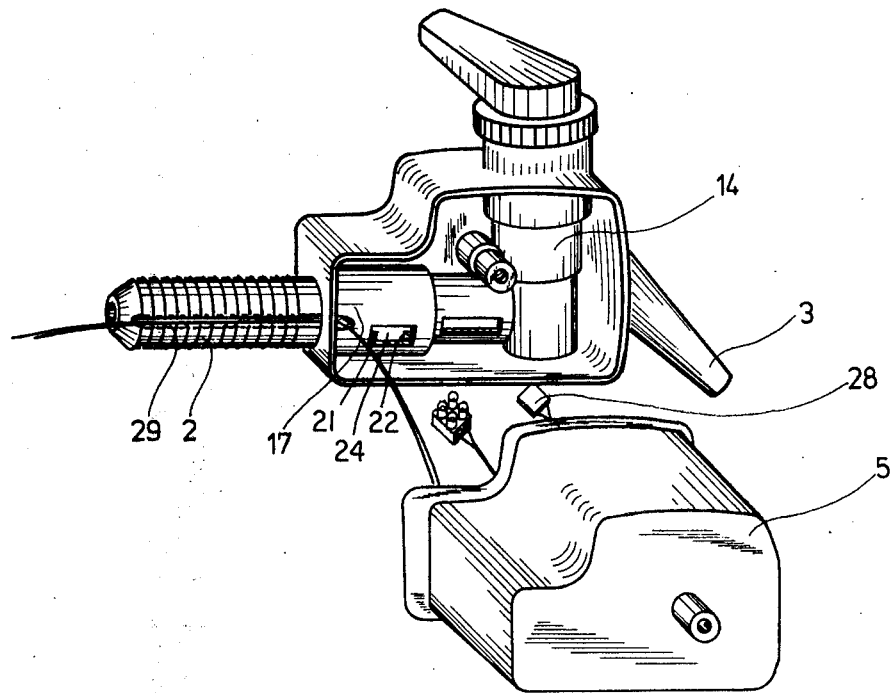
FIG. 2 is a measuring chamber with the electronic-component removed.
Figure 3:
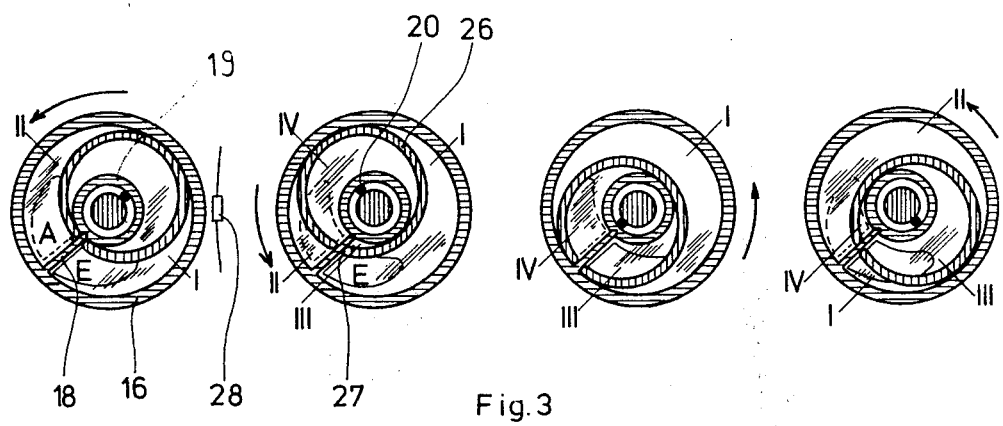
FIG. 3 shows operation of the measuring element and the construction of the measuring chamber.
Figure 4:
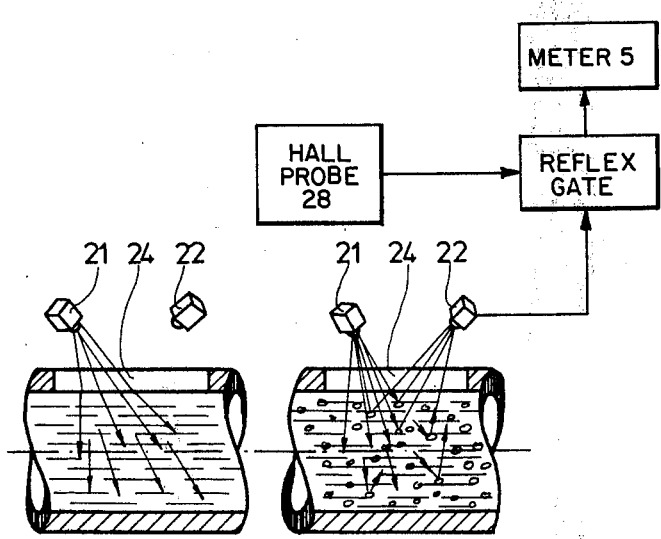
FIG. 4 is a diagram of a reflex gate.

On the left side of the housing part as seen from the exit, the electronic counting-and indicator unit 5 is arranged. As is evident from FIG. 2, the unit 5 must be completely separated from the actual tapping device. The liquid coming from the connection part, for example beer, passes a reflex gate prior to entry into the round measuring chamber 16 (FIG. 1). The reflex gate is located in the thicker part 17 of the connection stud 2. It has a window 24 which is set into the connection stud (FIGS. 2 and 4). In front of the window lies a photodiode 21 (FIG. 4) which emits an ultra-red invisible light beam through the window. When foam forms, the beam is reflected and bounces onto a phototransistor 22, which gives off a signal. Subsequently the liquid reaches the round measuring chamber 16 the schematic construction of which is evident from FIG. 3. The measuring chamber has two sickleshaped openings E (entrance) and A (exit). The two openings A and E are separated by a separating wall 18. Concentrically a carrier element 19 is rotatably arranged in the measuring chamber which is provided with a cast-in permanent-magnet 20. Accordingly, the volume of the measuring chamber is formed by a torus-shaped area which is limited by the carrier element to the inside and by the wall of the measuring chamber to the outside. In the measuring chamber is arranged a movable piston 26 which is provided with a slit 27 which reaches over the separating wall 18.

The operation of the measuring device is as follows:

First Phase

The sickel-shaped area I is connected with the entrance E and is under the liquid pressure. This pressure moves the piston 26 in the direction of the arrow. Area I is sealed off via the piston from area II which is connected to the exit.

Second Phase

Due to the liquid pressure, area I has increased and the piston was moved further. Area II has shrunk proportionally. At the same time, the interior III connects with the entrance and the interior IV with the exit.

Third Phase

The piston has made half a rotation. The exterior I is now separated from the entrance. Interior II is completely connected with the entrance and the interior IV completely with the exit.

Fourth Phase

While area III increases, the piston moves further in the direction of the arrow. Area I forms anew. Area II decreases as well as area IV. Through the overlapping of the separated interior- and exterior areas, i.e. the piston interior- and the piston exterior areas, develops the continuous movement of the piston.

The piston moves the cylindrical carrier part 19 which contains the permanent-magnet 20. The changing magnetic field is scanned by a Hall-probe which is affixed to the outside of the measuring chamber, whereby an alternating current is produced in the probe, which is changed into electric square-wave impulses in an intensifier- and molder stage. Since the piston rotations and/or the rotations of the carrier part are proportional to the volume flow through, a direct correlation between amount and counting impulses can be made. The impulses are guided to an electric counting chain and are registered.

FIG. 2 shows the connection of the Hall-probe 28.

The current feed for the electronic measuring component takes place via a connection 29 which is placed in a nut of the connection stud 2.

The impulses from the reflex-gate are coupled via and UND-screen in such a manner with the impulses from the Hall-probe that the counting impulses are transmitted only when a compact liquid flows through the reflex-gate area. With each rotation of the piston and when the UND-screen is freed, the counting chain advances by one number. So-called seven-segment-displays are provided for recording purposes.

The components required for assembly of the control set forth are known individually.

For example, a feeding apparatus is necessary for the supply of current which produces the supply voltage of 6.5 volts. A buffer accumulator is provided so that in the case of power failure the measured value is not lost. It takes over the supply of current automatically in case of power failure.

Moreover, it is proposed as an alternative to facilitate the supply of current directly through the piston rotation in that a small generator is connected with the axis of the carrier element, whereby a sufficient amount of current can be produced.

The central housing part with measuring chamber is preferably made of a flass-fiber-reinforced plastic material, which is harmless in regard to handling foodstuffs and is dielectrically neutral.

What is claimed is:

1. Measuring device for beverage-tapping apparatus having a feed line from a source of supply of the beverage and connected to said feed line, a measuring chamber, a volume measuring device with a meter connected thereto, and a value and valve outlet downstream of the measuring chamber, light sensing means positioned upstream of the measuring chamber adapted to distinguish foam from compact liquid, said volume measuring device having at least one rotating means which revolves proportionately to the beverage flow, said rotating means acting on impulse sender means which sends at least one impulse to electronic gate means with each rotation, said gate means being adapted to also receive a signal from the sensing means and then act upon said meter with impulses to be counted only when compact liquid is present.

2. Measuring device of claim 1 wherein the sensing means is a photocell.

3. Measuring device of claim 2 wherein an infrared lamp as a source light is associated with the photocell.

4. Measuring device of claim 1 wherein said rotating means is a substantially cylindrical measuring chamber in which a rotating piston carrying an impulse center is positioned.

5. Measuring device of claim 1 wherein the measuring chamber is cylindrical with a centrally arranged carrier element around which a cylindrical piston rotates, a wandering hollow area being formed between the inside of said measuring chamber and the outside of said piston whereby a measured liquid volume is transported from an inlet to an outlet.

6. Measuring device of claim 5 wherein the measuring chamber inlet and outlet are separated by a wall and are periodically swept over during movement of the piston by the piston-cross-section area, said separation wall passing through a slit in the piston.

7. Measuring device of claim 1 wherein a permanent magnet is carried by the rotating means and a Hall-probe is positioned outside the measuring chamber.

8. Measuring device of claim 1 wherein the volume measuring device, the meter and the sensing means are built into a filling installation shaped like a tapping valve.

* * * * *